United States Patent [19]

Ray et al.

[11] Patent Number: 5,424,113
[45] Date of Patent: Jun. 13, 1995

[54] LATTICE CORE SANDWICH CONSTRUCTION

[75] Inventors: Hemen Ray, Perkasie, Pa.; Lee W. Gause, Oakton, Va.

[73] Assignee: The United States of America as represented by the Secretary of the Navy, Washington, D.C.

[21] Appl. No.: 82,067

[22] Filed: Jun. 23, 1993

[51] Int. Cl.⁶ .......................... B32B 3/12; E04C 2/36
[52] U.S. Cl. ........................... 428/178; 428/72; 428/175; 428/179; 428/188; 428/222; 428/233; 428/293; 428/377; 52/806; 52/807; 52/808
[58] Field of Search ............... 428/178, 172, 116, 377, 428/175, 179, 188, 72, 114, 222, 226, 233, 227, 293; 52/806, 807, 808

[56] References Cited

U.S. PATENT DOCUMENTS

| | | | |
|---|---|---|---|
| 3,542,636 | 11/1970 | Wandel | 428/182 |
| 3,552,277 | 1/1971 | Avital | 94/15 |
| 3,574,103 | 4/1971 | Latkin | 428/182 |
| 3,871,149 | 3/1975 | Georgii | 52/404 |
| 4,472,473 | 9/1984 | Davis et al. | 428/184 |
| 4,769,968 | 9/1988 | Davis et al. | 52/814 |
| 5,028,474 | 7/1991 | Czaplicki | 428/178 |
| 5,162,143 | 11/1992 | Porter et al. | 428/179 |

Primary Examiner—Donald J. Loney
Attorney, Agent, or Firm—James V. Tura; Susan E. Verona

[57] ABSTRACT

A novel form of sandwich construction is disclosed. The lattice core sandwich construction comprises of elongate lattice cells in side-by-side abutment, to present common, lengthwise flat sides that have facesheets co-cured thereto without any secondary bonding. Each lattice cell is formed by wrapping, in alterate patterns, fiber-reinforced, composite bands around commonly-shaped mandrels. Opppositely disposed face sheets are placed against flat sides and the construction co-cured. After co-curing, the mandrels are removed.

9 Claims, 3 Drawing Sheets

LATTICE CORE SANDWICH CONSTRUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to sandwich constructions suitable for use in structural and non-structural members, and more particularly to sandwich constructions of low-density cores secured between thin-gauge, high-strength face sheets for use in a wide range of military, industrial and commercial components.

Sandwich constructions are finding broad application as structural and non-structural members in boats, aircraft, furniture, refrigerators, and other items requiring high strength, lightweight materials. They typically include face sheets bonded to either side of a low density core. The sheets are made of such materials as metals, plastic, or composite fiber glass laminates for rigidity and strength. Among the various core materials, are rigid plastic foams and honeycombs made from layers of corrugated metal sheets or expanded layers of resin-impregnated plastic sheets.

In airplane design the need for weight efficiency and aerodynamically smooth surfaces under high stress levels has stimulated use of sandwich construction as a possible substitute for the conventional sheet-stringer construction. Notwithstanding the superior weight-efficiency of the sandwich constructions, their general acceptance for critical applications has lagged behind theoretical development primarily because of maintenance problems experienced in service. Honeycomb core sandwich constructions are considered to be among the most weight-efficient but, they have a tendency to retain moisture which may become entrapped due to ineffective edge seals, damage to the face sheets or unbonding of face sheets from the core. This may degrade the structural integrity and lead to extensive corrosion and premature failure of components. Experience has shown a significant frequency of repairs on sandwich structures or sandwich structure part replacements which are very time-consuming and expensive.

SUMMARY OF THE INVENTION

Accordingly, an object of the present invention is to provide a sandwich construction having a high strength-to-weight efficiency suitable for a broad variety of military, industrial and commercial applications.

Another object is to provide a low-density core sandwich construction in which corrosion and degradation of structural integrity due to retention of moisture is substantially eliminated.

Another object is to provide a sandwich construction in which unbonding of face sheets from the core is substantially reduced or eliminated when heat, pressure or vacuum is applied for purposes of repair.

Still another object is to provide a sandwich construction having a flexible core with structural discontinuities for improved tolerance for damage.

A further object is to provide a method of fabricating a low-density core sandwich construction in a single curing process.

A still further object is to provide a sandwich construction having a core with passageways for arresting cracks developed during use or upon impact.

These and other objects of the invention are achieved in a sandwich construction comprising a core of elongate lattice cells in side-by-side abutment and secured between two face sheets. Each lattice cell is defined by an openwork structure of crisscrossed bands of stiff material helically formed around the longitudinal axis thereof. A cell is formed by wrapping two bands in opposite directions around a mandrel of lengthwise uniform cross section and opposite flat sides for contiguously interfacing complementary sides of adjacent cells and the face sheets. With the mandrels in place, the cells are then secured between the face sheets and cured in a single curing process after which the mandrels are removed.

BRIEF DESCRIPTION OF THE DRAWINGS

Further objects and advantages of the invention will become apparent from the following detailed description taken in conjunction with the accompanied drawings wherein.

DETAILED DESCRIPTION OF THE PREFERRED EMBODIMENT

Figure 1:
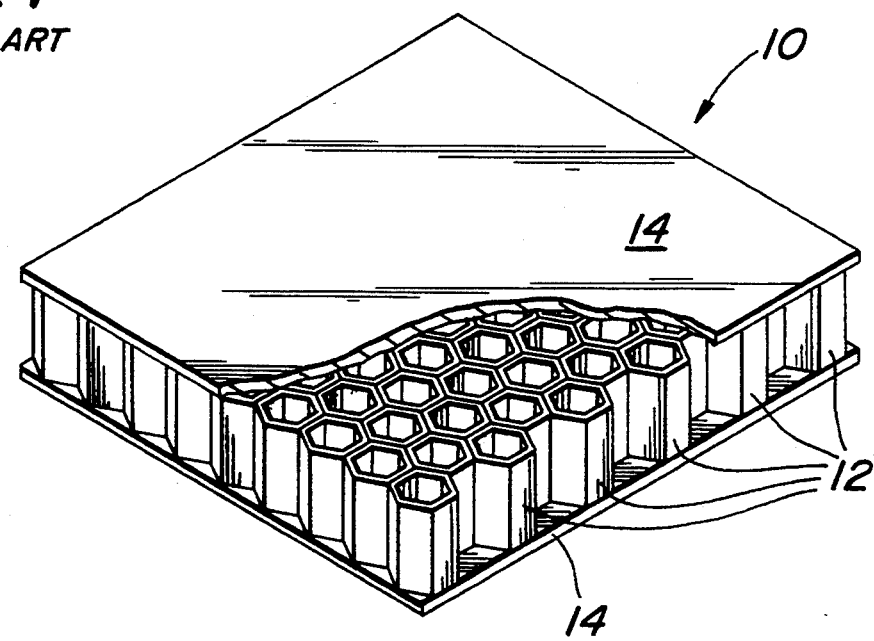
FIG. 1 represents a perspective view, with the upper face sheet partially cutaway, of a prior art honeycomb core sandwich construction.

Referring now to the drawings wherein like referenced characters designate like or corresponding components throughout the several views, there is shown in FIG. 1 a typical prior art honeycomb core sandwich construction 10 having a low density core consisting of hexagonal cells 12 bonded at their ends to face sheets 14. However, under stress the face sheets may crack or separate from the cell ends permitting moisture to accumulate and with time cause the core to increase in weight and corrode. The usual procedure for repair entails resealing the cell ends by applying an adhesive and applying heat and pressure (or vacuum) to the external surfaces of the facing sheets. This is unreliable and sometimes causes further unbonding of face sheets and core.

Figure 3:
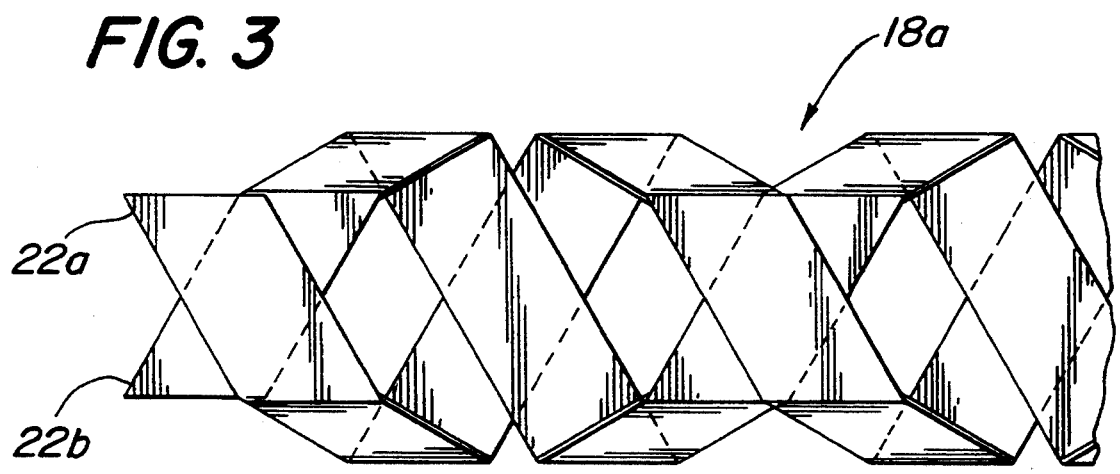
FIG. 3 is a top view of a lattice cell of crisscrossed bands of material helically wound according to the invention around a trapezoidal mandrel (not shown)
Figure 4:
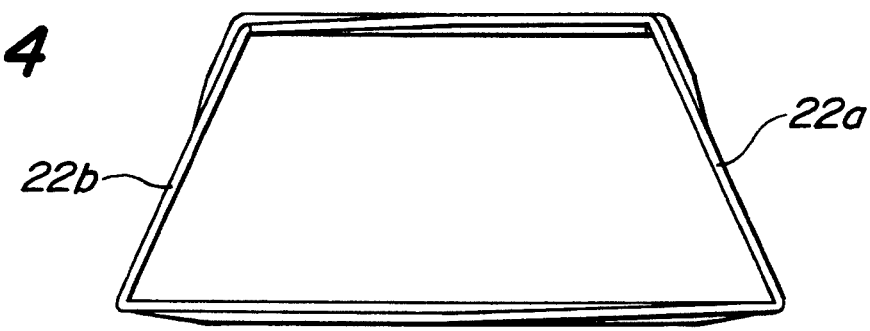
FIG. 4 is an end view of the cell of FIG. 3.
Figure 2:
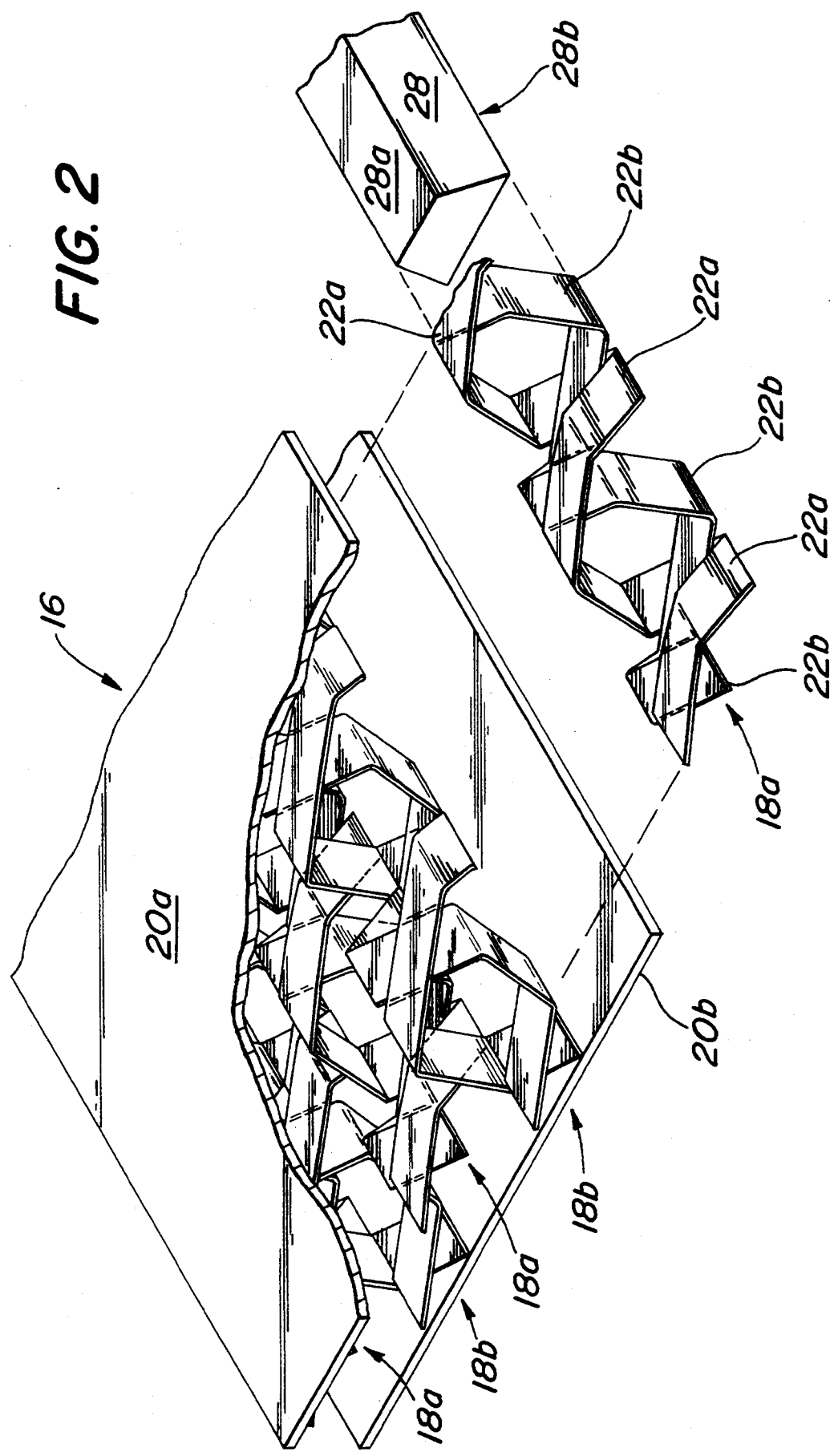
FIG. 2 represents a perspective view, with the upper face sheet partially cutaway, of a lattice core sandwich construction according to the invention with a single cell extended from the construction to more clearly show the relationship of the mandrel to the cell.
Figure 5:
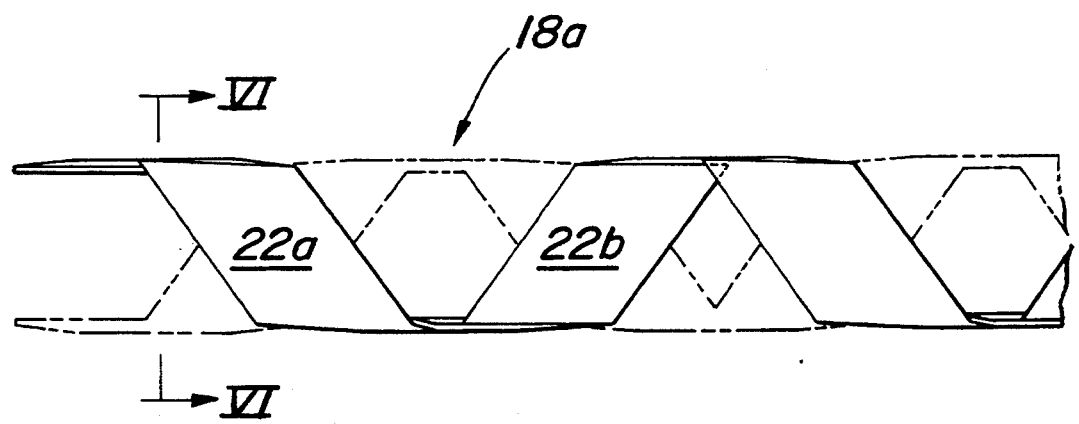
FIG. 5 is a side view of a single cell showing a single band wrapping.
Figure 6:
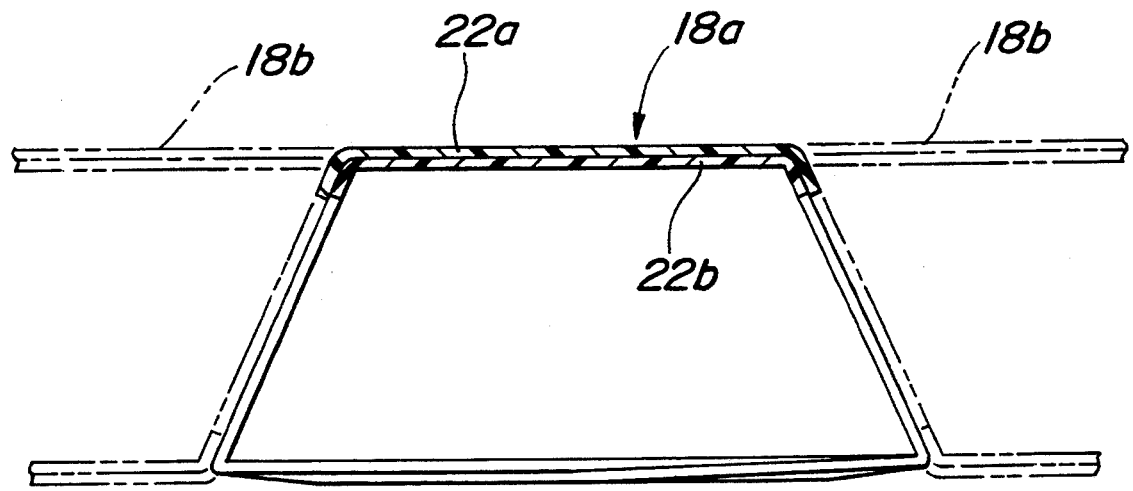
FIG. 6 is a cross-sectional view of a single wrapping taken along lines VI—VI of FIG. 5.

Referring to the inventive embodiment of FIGS. 2 through 4, there is shown a lattice core sandwich construction 16 of elongate cells 18a and 18b in side-by-side alignment between face sheets 20a and 20b. Each cell 18a or 18b defines in transverse cross section and isosceles trapezoid formed by stiff bands 22a and 22b of fiber-reinforced composite helically wound in opposite directions along a longitudinal axis. Bands 22a and 22b crisscross at intervals on the unequal sides of the cells and are attached to face sheets 20a and 22b by co-curing. The unequal sides of cells 18a are inverted with respect to those of cells 18b to provide contiguous contact of interfacing equal sides of adjacent cells. Thus, it can be seen that the openwork lattice provides communication between cells for preventing stagnation of any accumulated moisture and thereby minimizing corrosion.. In addition, the various angles of bands 22a and 22b formed relative to the interfacing planes of facing sheets 20a and 20b and to the sides of cells 18a and 18b, provide a sandwich construction of comparable strength.

The method of fabricating the above-described lattice core sandwich construction 16 can be explained with reference to FIGS. 2 through 6. Each cell 18a and 18b is formed by wrapping bands 22a and 22b around and along the length of an elongate mandrel 28 of isosceles trapezoidal transverse cross section. In the illustrated embodiment, the bands are a fiber-reinforced, resin-impregnated composite and the mandrel is solid plastic type material, such as TFE or other similar materials, to facilitate its removal after curing. Bands 22a and 22b are helically wrapped such that they crisscross on unequal opposite sides 28a and 28b of mandrel 28 and leave open spaces therein for moisture communication. The wrapped mandrels are then placed, alternately inverted, in side-by-side abutment between fiber-reinforced resinous composite face sheets 20a and 20b and co-cured without any secondary bonding to the exposed bands of cells 18a and 18b. At this point in the operation, mandrels 28 are removed (see FIG.

Other acceptable tooling materials and mandrel configurations are contemplated depending on the application, core and face sheet materials, and bonding process. Of course, the composition of the materials and the shape of the mandrels will influence the structural strength and integrity of the finished lattice core sandwich construction. In some applications, the mandrel may be inflatable to incorporate complex shapes. Furthermore, the lattice cells may be fabricated from bands of composites or metal and attached to the face sheets by secondary bonding.

Some of the many advantages of the invention should now be readily apparent. For example, the lattice core sandwich construction provides passageways from cell to cell allowing moisture to drain and reduce the tendency for corrosion. The lattice core provides flexibility and discontinuity for improved tolerance for damage. Cracks developed due to impact are arrested. The lattice core sandwich construction is cost effective because it is especially suitable for resin transfer-molding woven fabrics on reusable solid or inflatable mandrels. The tendency for unbonding face sheets from the core due to heat and pressure (or vacuum) during repairs is also substantially reduced or eliminated.

It will be understood that various changes in the details, materials, steps and arrangement of parts, which have been herein described and illustrated in order to explain the nature of the invention, may be made by those skilled in the art within the principles and scope of the invention as expressed in the appended claims.

What we claim is:

1. A sandwich construction comprising:
   lattice core means having a plurality of elongate cells, each cell having bands helically wound in opposite directions around a longitudinal axis with at least one moisture venting space therein and forming at least one lengthwise flat side, and said cells arranged in side-by-side abutment with adjacent ones of said flat sides facing in the same direction; and,
   face sheet means secured to said adjacent flat sides.

2. A sandwich construction according to claim 1 wherein:
   said bands crisscross on said flat side at spaced intervals.

3. A sandwich construction according to claim 2 wherein:
   each of said cells has opposite equal sides and opposite unequal sides defining, in transverse cross section, an isosceles trapezoid; and
   said bands crisscross the unequal sides of said cell.

4. A sandwich construction according to claim 3 wherein:
   said face sheet means includes two parallel layers; and
   said cells are arranged side-by-side with alternately inverted cells between said layers.

5. A sandwich construction according to claim 4 wherein:
   said bands and said layers are fiber-reinforced composites.

6. A sandwich construction comprising:
   lattice core means having a plurality of elongate cells, each cell having two bands of material helically wound in opposite directions around a longitudinal axis so as to allow at least one open, moisture venting space therein and forming opposite equal sides and opposite unequal sides defining in transverse cross section an isosceles trapezoid, and said cells being arranged side-by-side with the equal sides of adjacent cells in abutment, and the unequal sides facing in opposite directions and allowing self-venting of moisture particles from inside a cell; and
   face sheets secured to the unequal sides.

7. A sandwich construction according to claim 6 wherein:
   said bands crisscross on said unequal sides at lengthwise intervals.

8. A sandwich construction according to claim 7 wherein:
   said cells are arranged with the unequal sides alternately inverted between the sheets.

9. A sandwich construction according to claim 8 wherein:
   said bands and said sheets are fiber-reinforced composites.

* * * * *